United States Patent

Shin et al.

(10) Patent No.: US 8,681,415 B2
(45) Date of Patent: Mar. 25, 2014

(54) ELECTROPHORETIC DISPLAY DEVICE AND FABRICATION METHOD THEREOF

(75) Inventors: Sang-Il Shin, Gyeonggi-Do (KR); Oh-Nam Kwon, Gyeonggi-Do (KR); Seung-Han Paek, Gyeonggi-Do (KR); Choon-Ho Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 13/182,150

(22) Filed: Jul. 13, 2011

(65) Prior Publication Data

US 2012/0013970 A1    Jan. 19, 2012

(30) Foreign Application Priority Data

Jul. 14, 2010   (KR) .................. 10-2010-0068130
Oct. 1, 2010    (KR) .................. 10-2010-0096127

(51) Int. Cl.
   *G02B 26/00*    (2006.01)
   *G09G 3/34*     (2006.01)

(52) U.S. Cl.
   USPC ............. 359/296; 359/228; 345/107; 445/24; 430/32

(58) Field of Classification Search
   USPC ............. 359/296, 245, 228, 452; 345/84, 85, 345/105, 107, 175, 205, 214; 156/60, 156/275.5; 204/192.1; 445/24, 25; 977/742; 438/28; 430/31, 32
   See application file for complete search history.

(56) References Cited

U.S. PATENT DOCUMENTS

| | | | | |
|---|---|---|---|---|
| 6,741,386 B2 * | 5/2004 | Minami | .............. | 359/296 |
| 6,850,357 B2 * | 2/2005 | Kaneko et al. | ............ | 359/296 |
| 6,885,495 B2 * | 4/2005 | Liang et al. | ............ | 359/296 |
| 6,922,275 B2 * | 7/2005 | Ikeda | .............. | 359/296 |
| 7,271,947 B2 * | 9/2007 | Liang et al. | ............ | 359/296 |
| 7,382,351 B2 * | 6/2008 | Kishi | .............. | 345/107 |
| 7,834,842 B2 * | 11/2010 | Ikeda et al. | ............ | 345/107 |
| 8,144,116 B2 * | 3/2012 | Nagayama | .......... | 345/107 |
| 2004/0165252 A1 | 8/2004 | Liang et al. | | |
| 2009/0078938 A1 | 3/2009 | Yamazaki | | |
| 2010/0302620 A1 | 12/2010 | Makubo | | |
| 2011/0157681 A1 * | 6/2011 | Kwon et al. | ............ | 359/296 |
| 2012/0008190 A1 * | 1/2012 | Shin et al. | ............. | 359/296 |
| 2012/0013968 A1 * | 1/2012 | Park et al. | ............. | 359/296 |
| 2012/0050840 A1 * | 3/2012 | Lim et al. | .............. | 359/296 |

FOREIGN PATENT DOCUMENTS

| | | |
|---|---|---|
| CN | 1947059 A | 4/2007 |
| CN | 101393370 A | 3/2009 |
| CN | 101609240 A | 12/2009 |
| WO | 2005103808 A1 | 11/2005 |
| WO | 2007004396 A1 | 1/2007 |

OTHER PUBLICATIONS

Chinese Office Action Dated Aug. 30, 2013, in Chinese Patent Application No. 201110197256.2.

* cited by examiner

*Primary Examiner* — Loha Ben

(74) *Attorney, Agent, or Firm* — Morgan, Lewis & Bockius LLP

(57) ABSTRACT

An electrophoretic display device in which a barrier defining a unit pixel is directly formed on a first substrate and the unit pixel is filled with an electrophoretic material, and a fabrication method thereof are provided. A barrier surrounding a display area is formed on a non-display area and a sealant is filled between the barrier and a partition wall to facilitate an attachment of first and second substrates.

20 Claims, 9 Drawing Sheets

ELECTROPHORETIC DISPLAY DEVICE AND FABRICATION METHOD THEREOF

CROSS-REFERENCE TO RELATED APPLICATIONS

This application claims priority to and benefit of Korean Application No. 10-2010-0068130 filed on Jul. 14, 2010, and Korean Application No. 10-2010-0096127 filed on Oct. 1, 2010, the entire contents of which are incorporated by reference herein.

BACKGROUND OF THE INVENTION

1. Field of the Invention

The present invention relates to an electrophoretic display device and a fabrication method thereof, and more particularly, to an electrophoretic display device including a barrier for preventing a sealant leakage, and a partition wall for preventing a sealant from being leaked when the electrophoretic display device is attached, and a fabrication method thereof.

2. Description of the Related Art

An electrophoretic display device is an image display device characterized in that when a pair of electrodes to which a voltage is applied are immersed in a colloid solution, colloid particles move toward either side of polarities. Unlike a liquid crystal display device, the electrophoretic display device does not use a backlight, and is desirable as a flexible display device for use as electronic paper (electronic book). The electrophoretic display device has many advantages, such as having a broad viewing angle, a high reflectivity, and low power consumption.

The electrophoretic display device is configured to have a structure in which an electrophoretic layer may be interposed between two substrates. One of the two substrates is configured as a transparent substrate while the other substrate is configured as an array substrate with a driving element formed thereon. The electrophoretic display device is configured to display an image in a reflective mode in which light input from the outside of the electrophoretic display device is reflected.

FIG. 1 is a cross-sectional view showing the structure of an electrophoretic display device in a related art. As shown in FIG. 1, the electrophoretic display device 1 includes a first substrate 20, a second substrate 40, a thin film transistor (TFT) as a switching element, a pixel electrode 18 formed on the first substrate 20, a common electrode 42 formed on the second substrate 40, an electrophoretic layer 60 formed between the first substrate 20 and the second substrate 40, and an adhesive layer 56 formed between the electrophoretic layer 60 and the pixel electrode 18.

The TFT includes a gate electrode 11 formed on the first substrate 20, a gate insulating layer 22 with the gate electrode 11 formed thereon disposed on the entire surface of the first substrate 20, a semiconductor layer 13 formed on the gate insulating layer 22, and a source electrode 15 and a drain electrode 16 formed on the semiconductor layer 13. A passivation layer 24 is formed on the source electrode 15 and the drain electrode 16 of the TFT.

The pixel electrode 18 for applying a signal to the electrophoretic layer 60 is formed on the passivation layer 24. In this configuration, a contact hole 28 is formed in the passivation layer 24, and the pixel electrode 18 is connected to the drain electrode 16 of the TFT via the contact hole 28.

A color filter layer 44 and a common electrode 42 are formed on the second substrate 40. The electrophoretic layer 60 is formed on the color filter layer 42, and the adhesive layer 56 is formed on the electrophoretic layer 60. The electrophoretic layer 60 includes capsules 70 filled with white particles 74 and black particles 76. When a signal is applied to the pixel electrode 18, an electric field is generated between the common electrode 42 and the pixel electrode 18. Further, the white particles 74 and the black particles 76 within the capsules 70 are driven to move by an electric force of the electric field, and an image is displayed on the electrophoretic display device.

For example, when a negative (−) voltage is applied to the pixel electrode 18 on the first substrate 20 and a positive (+) voltage is applied to the common electrode 42 on the second substrate 40, the white particles 74 assuming the positive (+) charges move toward the first substrate 20 and the black particles 76 assuming the negative (−) charges move toward the second substrate 40. In this configuration, when light is input from an outer side, i.e., from an upper side of the second substrate 40, the input light is reflected by the black particles 76, and black is displayed on the electrophoretic display device.

Alternatively, when a positive (+) voltage is applied to the pixel electrode 18 on the first substrate 20 and a negative (−) voltage is applied to the common electrode 42 on the second substrate 40, the white particles 74 assuming the positive (+) charges move toward the second substrate 40 and the black particles 76 assuming the negative (−) charges move toward the first substrate 20. In this configuration, when light is input from an outer side, i.e., from an upper side of the second substrate 40, the input light is reflected by the white particles 74, and white is displayed on the electrophoretic display device.

However, the related art electrophoretic display device illustrated in FIG. 1 has the following problems.

First, in a method for fabricating the electrophoretic display device in the related art, it is difficult to attach the first and second substrates.

In the electrophoretic display device of the related art, the first substrate 20 and the second substrate 40 are separately fabricated and further attached by an adhesive layer 56 to be completed. In a detailed configuration, the TFT for driving the unit pixels and the pixel electrode 18 for applying an electric field to the electrophoretic layer are formed on the first substrate 20, the common electrode 42, the color filter layer 44, the electrophoretic layer 60, and the adhesive layer 56 are formed on the second substrate 40 through a separate process, and then the first substrate 20 and the second substrate 40 are attached.

However, since the unit pixels of the electrophoretic display device are normally formed to have a small size of approximate 150 micrometers in width and length, it is very difficult in the related art to align the electrophoretic layer to precisely fit into the desired size. When the electrophoretic layer is aligned, if the first substrate 20 with the electrophoretic layer 60 and the TFT formed thereon is not precisely aligned, an electric field may not be properly transferred to the electrophoretic particles, therefore causing a driving signal error.

Second, the fabrication process of the method for fabricating the electrophoretic display device in the related art is complicated.

The first substrate 20 and the second substrate 40 are separately fabricated through different processes, transferred by a transfer unit, and further attached through an attaching process. As a result, the first substrate 20 and the second substrate 40 are not formed in an in-line manner in the fabrication process.

Third, when the first substrate 20 and the second substrate 40 are attached, static electricity is generated and causes a defective initial arrangement of the electrophoretic particles.

The common electrode 42, the color filter layer 44 and the electrophoretic layer 60 are formed on the second substrate 40, and the adhesive layer 56 is applied to the electrophoretic layer 60. Further, to prevent the adhesive strength of the adhesive layer 56 from degrading and an alien material from being attached to the adhesive layer 56, a protection film is attached to the adhesive layer 56. In this configuration, in order to attach the second substrate 40 to the first substrate 20, the protection film must be separated from the second substrate 40. However, electrostatic discharge generated during the process of peeling off the protection film may cause misalignment in the initial arrangement of the electrophoretic particles. The misalignment of the electrophoretic particles due to the electrostatic discharge may generate ripples with a comb pattern during the operation of the electrophoretic display device.

Fourth, the electrophoretic display device in the related art includes the adhesive layer 56 in order to attach the second substrate 40 to the first substrate 20. Since the adhesive layer 56 is positioned between the pixel electrode 56 and the common electrode 42, it hinders an electric field in acting on the electrophoretic particles. Further, a process for sealing the edges of the electrophoretic display device with a sealant is performed in order to prevent moisture or the penetration of an alien material to a display area. In this configuration, the gel state sealant overflows in the sealing process to contaminate the first and second substrates in sealing the first and second substrates. In addition, the design of the external appearance after the sealing operation is degraded.

SUMMARY OF THE INVENTION

An object of the present invention is to provide an electrophoretic display device in which an electrophoretic layer is directly formed on a substrate with a thin film transistor (TFT) formed thereon, thus preventing the misalignment between the electrophoretic layer and a first substrate and simplifying the fabrication process, and a fabrication method thereof.

Another object of the present invention is to provide an electrophoretic display device in which a barrier is formed at a non-display area surrounding a display area, and a space between the barrier and a partition wall is filled with a sealant thereby preventing the sealant from being leaked out when the first and second substrates are sealed, and a fabrication method thereof.

DETAILED DESCRIPTION OF THE PREFERRED EMBODIMENTS

An electrophoretic display device according to an exemplary embodiment of the present invention will now be described with reference to the accompanying drawings.

In a process of fabricating an electrophoretic display device according to the related art, the electrophoretic layer is generally formed on the second substrate, and the electrophoretic layer is provided by a different manufactory or a different component supplier, transferred to a fabrication factory in which a thin film transistor (TFT) is formed, and further attached to the first substrate. The related art has problems such as the fabrication process is delayed and complicated, and the second substrate is damaged in transferring by a transfer unit such as a vehicle or the like.

In an exemplary embodiment of the present invention, an electrophoretic layer is formed on the first substrate on which a TFT acting as a switching element is formed. The electrophoretic layer is formed in an in-line manner with the fabrication process of the TFT. Thus, the fabrication process in the present exemplary embodiment may be simplified and the processing time may be shortened. As a result, a mass-production can be achieved. Further, in the present exemplary embodiment, a barrier is formed at a non-display area, for example, an edge of the electrophoretic display device, to prevent a sealant from flowing to an outer side of a display area when the first and second substrates are attached, thus preventing the occurrence of defective sealing. Further, in the present exemplary embodiment, because the barrier prevents the electrophoretic particles filled in the unit pixels from flowing to the non-display area in the process of attaching the first and second substrates, the design of an external appearance of the electrophoretic display device after the first and second substrates are attached is improved.

Figure 1:
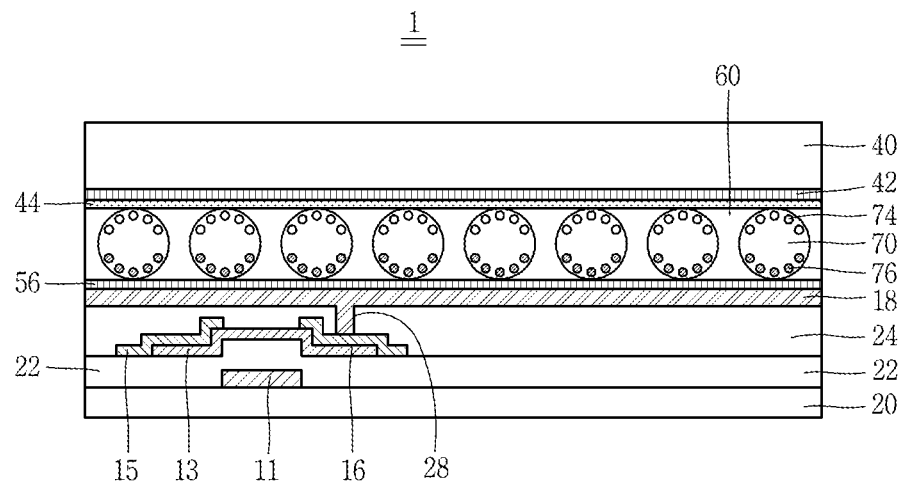
FIG. 1 is a sectional view of an electrophoretic display device in the related art.
Figure 2:
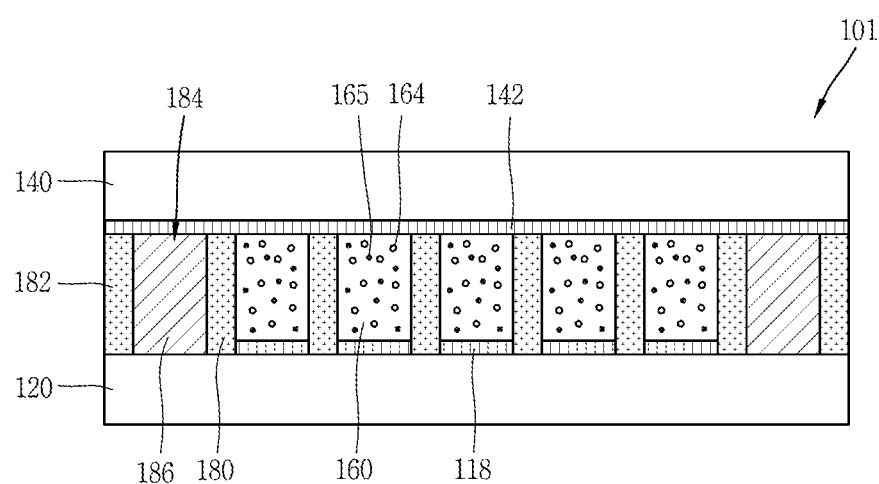
FIG. 2 is a sectional view of an electrophoretic display device according to a first embodiment of the present invention.

FIG. 2 is a sectional view of an electrophoretic display device according to a first exemplary embodiment of the present invention.

As shown in FIG. 2, an electrophoretic display device 101 according to the first exemplary embodiment of the present invention includes a first substrate 120 and a second substrate 140, an electrophoretic layer 160 formed between the first and second substrates 120 and 140, a sealant leakage preventing barrier 182 formed at an edge of the electrophoretic display device 101 to prevent a leakage of the sealant from flowing to the outside, and a pixel electrode 118 and a common electrode 142 formed on the first substrate 120 and the second substrate 140, respectively, to apply an electric field to the electrophoretic layer 160.

The electrophoretic display device 101 may be divided into an image display area in which unit pixels are arranged in a matrix form, and a non-image display area surrounding the image display area. Partition walls 180a and 180b are formed in the image display area, and in particular, the partition walls 180a and 180b are formed between the adjacent unit pixels to define the unit pixels. For example, the partition walls 180a and 180b are formed between pixels. The partition walls 180a and 180b may have a predetermined height, and the unit pixels defined by the partition walls 180a and 180b may have a space with a predetermined volume. The electrophoretic layer 160 is formed in the space.

The electrophoretic layer 160 includes an electrophoretic material that can be moved up and down when driven by an electric field generated between the common electrode 142 and the pixel electrode 118, and a dispersive medium acting as a solvent to allow the movement of the electrophoretic material thereon.

The electrophoretic particles may include white particles 164 and black particles 165. Each of the white particles 164 and the black particles 165 may be charged with positive charge or negative charge. Further, the electrophoretic particles may further include color particles in order to display a color. The color particles may be red, green, and blue particles or cyan, magenta, and yellow particles.

The partition walls 180a and 180b may be formed between the adjacent unit pixels to demarcate the unit pixels of the electrophoretic display device 101, and the electrophoretic material is filled in the unit pixels between the partition walls 180a and 180b to form the electrophoretic layer 160. In the electrophoretic display device of the related art, the electrophoretic layer is attached to the second substrate through a separate process from that of the first substrate, and then the second substrate is attached to the first substrate. Further, in the related art, a protective film for protecting the adhesive film from attaching to the second substrate is necessary, therefore causing the fabrication process to be complicated. Further, in the related art, static electricity is generated when the adhesive film is removed, causing a defective picture quality. Such problems in the related art do not arise in the present exemplary embodiment because the electrophoretic material is directly formed between the partition walls.

The barrier 182 may be formed at a non-display area of the first substrate 120. The barrier 182 may be formed to completely surround the display area. In another example, the barrier 182 may be configured to have an opening formed thereof. The opening is configured to allow an overflowing electrophoretic layer, after being filled in the unit pixels, to be discharged to the outside of the electrophoretic display device when the first and second substrates are attached. The barrier 182 may be disposed apart from the partition wall 180a at the outermost portion of the display area. Thus, a trench-shaped space 184 is formed between the partition wall 180a at the outermost portion of the display area and the barrier 182, and the sealant 186 is filled in the trench-shaped space 184.

The advantage of forming the barrier 182 according to an exemplary embodiment of the present invention will now be described.

In the related art, the first and second substrates 120 and 140 are separately formed and later attached. The sealant 186 is applied to an upper surface of the electrophoretic layer 160 filled in the unit pixels and to an upper surface of the partition wall 180a, and further, the second substrate 140 is attached to the first substrate 120 by the sealant 186.

In the related art, when the sealant 186 directly contacts with the electrophoretic layer 160, the electrophoretic particles in the electrophoretic layer 160 stick to the sealant 186 and can not to be driven by the electric field. The reason is because the sealant 186 and the electrophoretic layer 160 are made with mutually different physical properties, and the charged electrophoretic particles electrically cling to the sealant 186.

Further, in the related art, when the sealant 186 is dispensed to the non-display area in order to prevent the moisture or a penetration of an alien material to the display area, the gel state sealant 186 overflows to an outer side of the non-display area due to the pressure applied when the first and second substrates are attached.

As a result, in the related art, the electrophoretic particles clinging to the sealant 186 cannot be driven, and the sealant overflowing to an outer side of the non-display area causes contamination to degrade the design and quality. In particular, in order to cover the sealant overflowing to the outer side of the non-display area, the electrophoretic display device must be configured with a larger bezel.

However, in the present exemplary embodiment, the barrier 182 is formed to surround the image display area, the sealant 186 is filled in the space 184 between the barrier 182 and the partition wall 180a, and the first substrate 120 and the second substrate 140 are sealed by the sealant 186. Thus, the sealant 186 can be prevented from overflowing to an outer side of the non-display area, and the driving force applied to the electrophoretic particles filled in the unit pixels of the display area can be improved to ameliorate the quality of the electrophoretic display device.

Figure 3:
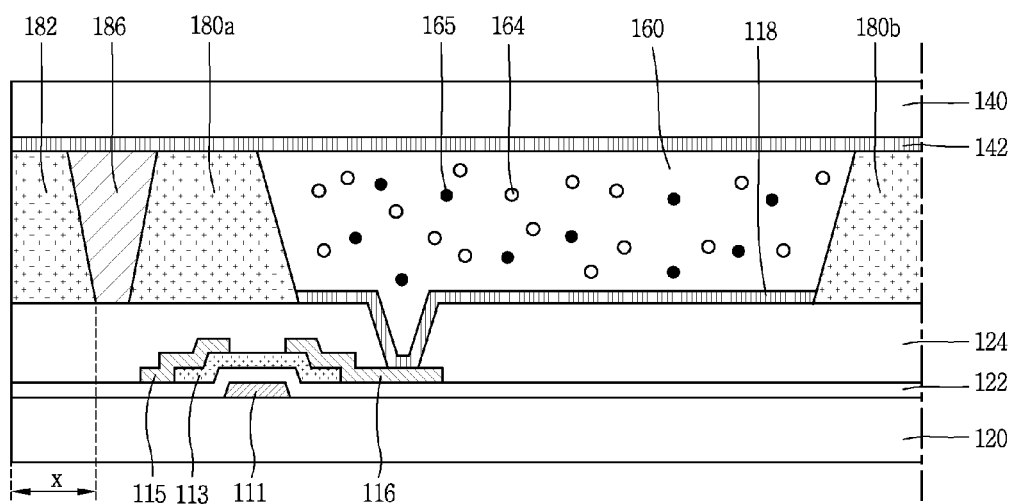
FIG. 3 illustrates an exemplary pixel structure of the electrophoretic display device according to the first embodiment of the present invention.

FIG. 3 illustrates an exemplary pixel structure of the electrophoretic display device according to the first exemplary embodiment of the present invention. As shown in FIG. 3, the partition wall 180a is formed at the outermost portion of the image display area and the barrier 182 is formed at the non-display area.

As shown in FIG. 3, the electrophoretic display device includes the first and second substrates 120 and 140 made of transparent glass or plastic. The electrophoretic display device includes the TFT formed on the first substrate 120, a passivation layer 124 formed on the first substrate 120 with the TFT formed thereon, the pixel electrode 118 formed at a display area on the passivation layer 124, the partition wall 180a formed on the passivation layer 124 and between unit pixels of the display area to define the unit pixels, the barrier 182 formed at a non-display area on the passivation layer 124, the electrophoretic layer 160 filled in the unit pixels between partition walls 180a and 180b, the common electrode 142 formed on the second substrate 140, and the sealant 186 filled in the space between the partition wall 180a and the barrier 182 to seal the first and second substrates 120 and 140 when the first and second substrates 120 and 140 are attached.

The TFT includes a gate electrode 111 formed on the first substrate 120, a gate insulating layer 122 formed on the gate electrode 111, a semiconductor layer 113 made of a semiconductor material such as an amorphous silicon (a-Si) and formed on the gate insulating layer 122, and a source electrode 115 and a drain electrode 116 formed on the semiconductor layer 113.

The passivation layer 124 is made of an organic insulating material such as a BCB (Benzo Cyclo Butene) or a photo acryl. A contact hole 117 is formed in the passivation layer 124 at an upper portion of the drain electrode 116 of the TFT to allow the pixel electrode 118 formed on the passivation layer 124 to be electrically connected with the drain electrode 116 of the TFT via the contact hole 117.

The partition walls 180a and 180b may be made of a photosensitive organic insulating material such as photo acryl, a resin, or the like.

The electrophoretic layer 160 may include white particles 164 having positive charge characteristics and black particles 165 having negative charge characteristics. Although not shown, the electrophoretic layer 160 may include color particles such as cyan, magenta, and yellow particles, or the like, color particles such as red (R), green (G), and blue (B) color particles.

The white particles 164 implement white. For example, when the white particles 164 having charge characteristics move toward the second substrate 140 as a voltage is applied between the pixel electrode 118 and the common electrode 142, light made incident from the outside of the second substrate 140 is reflected by the white particles 164, displaying white on the screen of the electrophoretic display device.

The black particles 165 implement black. For example, when the black particles having charge characteristics 165 move toward the second substrate 140 as a voltage is applied between the pixel electrode 118 and the common electrode 142, light made incident from the outside of the second substrate 140 is absorbed by the black particles 165, displaying black on the screen of the electrophoretic display device.

When the electrophoretic layer 160 includes color particles, color particles such as cyan, magenta, and yellow particles, or the like, the color particles such as red (R), green (G), and B (blue) color particles implement color. For example, when the color particles having charge characteristics move toward the second substrate 140 as a voltage is applied between the pixel electrode 118 and the common electrode 142, light made incident from the outside of the second substrate 140 is reflected by the color particles to display colors corresponding to pertinent pixels on the screen of the electrophoretic display device, and a desired color can be implemented by combining the colors.

The electrophoretic layer 160 may include a dispersive medium such as a liquid polymer. The white particles 164 and the black particles 165 are dispersed in the dispersive medium, and move within the dispersive medium according to the applied voltage. The dispersive medium may include air. For example, instead of a particular liquid dispersive medium, air may act as a medium for moving the white particles 164 and the black particles 165. Further, the electrophoretic layer 160 may not include a dispersive medium. In such embodiment, the white particles 164 and the black particles 165 move by an electric field according to the applied voltage, thus implementing an image.

Meanwhile, when the liquid polymer is used as the dispersive medium, a transparent liquid polymer is used, or a color liquid polymer having a color corresponding to the color of the unit pixels may be used. For example, cyan liquid polymer may be filled in the unit pixels including cyan color particles assuming cyan color, a magenta liquid polymer may be filled in pixels including magenta color particles assuming the magenta color, and a yellow liquid polymer is filled in the color including yellow color particles assuming yellow color.

The barrier 182 may be made of an organic insulating material, or the like. The barrier 182 may be made of the same material as that of the partition walls 180a and 180b, and formed through the same process when the barrier 182 is formed. When the barrier 182 and the partition walls 180a and 180b are made of the same photosensitive organic material, the barrier 182 can be simultaneously formed through a single masking process in the step of forming the partition walls 180a and 180b. Therefore, the processing time is shortened. In the present embodiment, the height of the barrier 182 may range from 1 μm to 100 μm and a line width x of the barrier 182 may range from 10 μm to 5,000 μm. In another embodiment, the height of the barrier 182 may range from 1 μm to 50 μm, and the line width x of the barrier 182 may range from 100 μm to 1,000 μm.

Figure 4A:
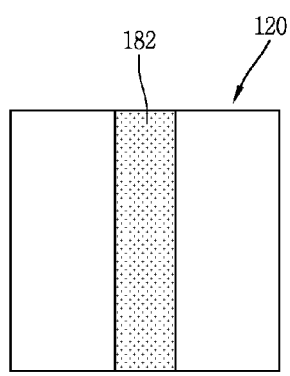
FIGS. 4A to 4C illustrate exemplary shapes of barriers of the electrophoretic display device according to the first embodiment of the present invention.
Figure 4B:
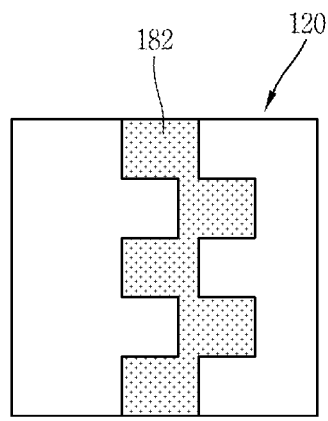
Figure 4C:
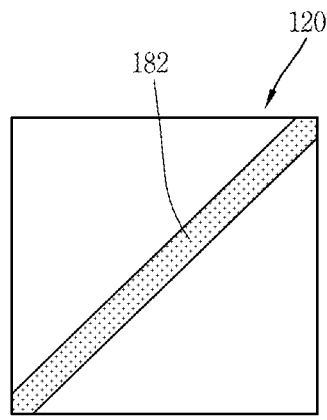

In the present embodiment, only one barrier 182 is formed at an outer side of the partition wall 180a. However, in another embodiment, a plurality of barriers may be formed. The number of the barriers 182 may range from 1 to 5. Further, when two barriers 182 are formed, an increase in the area of the electrophoretic display device may be minimized, and the adhesive force and the sealing force may be maximized. The barrier 182 may have various shapes from a top view. For example, the barrier 182 may have a linear shape as shown in FIG. 4A, a zigzag shape as shown in FIG. 4B, and a linear shape along an oblique line direction as shown in FIG. 4C.

The space between the barrier 182 and the partition wall 180a is filled with the sealant 186 to seal the first and second substrates 120 and 140 when the first and second substrates 120 and 140 are attached to each other. The space is formed along an outer circumference of the electrophoretic display device 101.

The barrier 182 and the partition wall 180a are employed to guide the position of the sealant 186 filled in the space therebetween so that the sealant 186 is not spread in an inner side or an outer side of the sealing area. Various types of materials may be used as the sealant 186, and in some embodiments, a UV curable sealant or a thermosetting sealant is commonly used.

The pixel electrode 118 is made of a transparent conductive material or opaque metal, and is electrically connected to the drain electrode 116 of the TFT via the contact hole 117 formed in the passivation layer 124.

In another embodiment, the pixel electrode 118 may be formed only at the display area on the passivation layer 124, while in other embodiments, the pixel electrode 118 may be extended to an upper portion of the passivation layer 124 and an upper portion of a side wall of the partition walls 180a and 180b.

When the pixel electrode 118 is formed to extend to the upper portion of the passivation layer 124 and the upper portion of the side wall of the partition walls 180a and 180b, a dead area generated at the pixel electrode 118 formed at the corner area of the passivation layer 124 and the partition walls 180a and 180b can be removed, thus improving the aperture ratio, the contrast ratio, and the response speed.

The common electrode 142 may be made of a transparent conductive material such as ITO or IZO.

In the electrophoretic display device 101 according to an exemplary embodiment of the present invention, because the partition walls 180a and 180b are directly formed on the first substrate 120, and the electrophoretic layer 160 is filled in the pixel between the partition walls 180a and 180b, the electrophoretic layer 160 is directly formed on the pixel electrode 118 so that the electrophoretic layer 160 is in direct contact with the pixel electrode 118. Thus, unlike the electrophoretic display device of the related art, in the present invention, an adhesive layer for attaching the electrophoretic layer 160 is not required between the electrophoretic layer 160, the pixel electrode 118 and the passivation layer 124. Therefore, the fabrication process can be simplified to reduce the fabrication cost.

Further, in the present exemplary embodiment, the barrier 182 is formed and the sealant 186 is filled in the space between the barrier 182 and the partition wall 180 to attach and seal the first and second substrates 120 and 140, a defect caused by a leakage or penetration of the sealant 186 can be prevented. Further, since the first and second substrates 120 and 140 are reliably sealed, moisture, air, or the like, can be prevented from penetrating into the electrophoretic display device 101.

FIGS. 5A to 5G illustrate an exemplary method for fabricating an electrophoretic display device according to the first exemplary embodiment of the present invention. The fabrication method is illustrated using an exemplary unit pixel configured with a barrier for the purpose of brevity.

Figure 5A:
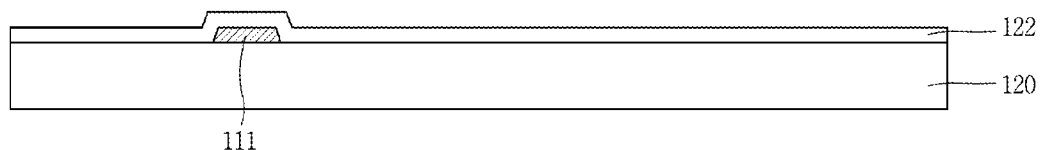
FIGS. 5A to 5G illustrate an exemplary method for sequentially fabricating an electrophoretic display device according to the first embodiment of the present invention.

First, as shown in FIG. 5A, opaque metal having good conductivity such as Cr, Mo, Ta, Cu, Ti, Al, or an Al alloy is stacked on the first substrate 120, which includes a display area and a non-display area and is made of a transparent material such as glass or plastic, through a sputtering process and further an etching process through photolithography to form the gate electrode 111. Further, an inorganic insulating material such as $SiO_2$, $SiN_x$, or the like, is stacked on the first substrate 120 with the gate electrode 111 formed thereon through CVD (Chemical Vapor Deposition) to form the gate insulating layer 122.

Figure 5B:
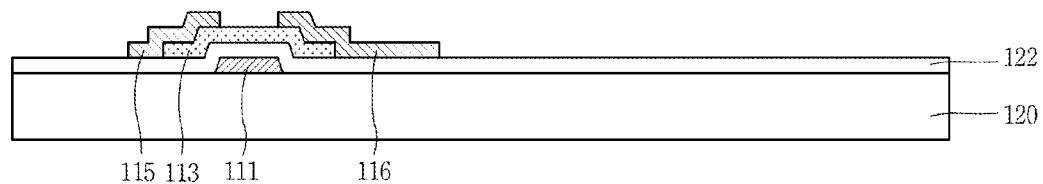

Subsequently, as shown in FIG. 5B, a semiconductor material such as amorphous silicon (a-Si) is stacked on the entire surface of the first substrate 120 through CVD, and further etched to form the semiconductor layer 113. Although not shown, impurities may be doped on a portion of the semiconductor layer 113, or amorphous silicon including impurities may be stacked on a portion of the semiconductor layer 113 to form an ohmic-contact layer, thus allowing the source electrode and the drain electrode to be in ohmic-contact with the semiconductor layer 113.

Thereafter, as shown in FIG. 5B, opaque metal having good conductivity such as Cr, Mo, Ta, Cu, Ti, Al, or an Al alloy is stacked on the first substrate 120 through a sputtering process and further an etching process to form the source electrode 115 and the drain electrode 116 on the semiconductor layer 113. Specifically, on the ohmic-contact layer, an organic insulating material such as BCB or photo acryl is further stacked on the entire surface of the first substrate 120 with the source electrode 115 and the drain electrode 116 formed thereon to form the passivation layer 124.

Figure 5C:
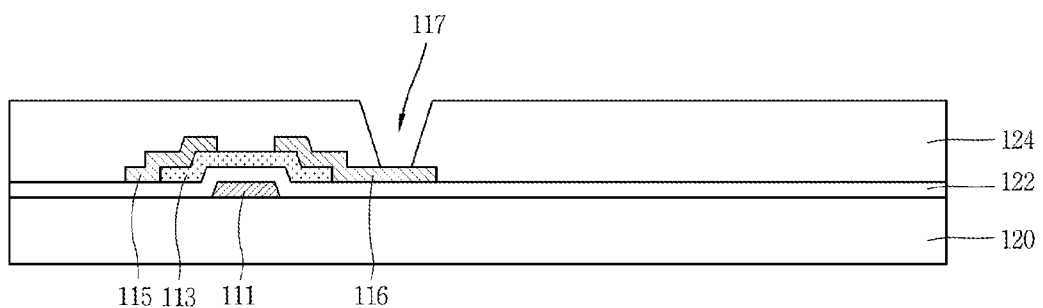

Although not shown in FIG. 5C, the passivation layer 124 may be formed as a plurality of layers. For example, the passivation layer 124 may be formed as a dual-layer including an organic insulating layer made of an organic insulating material such as BCB or photo acryl, and an inorganic insulating layer made of an inorganic insulating material such as $SiO_2$, $SiN_x$, or the like. In another embodiment, the passivation layer 124 may be formed as a triple-layer including an inorganic insulating layer, an organic insulating layer, and an inorganic insulating layer. Since the organic insulating layer is formed, the surface of the passivation layer 124 is formed to be smooth. Further, since the inorganic insulating layer is applied, the interface characteristics with the passivation layer 124 can be improved.

Figure 5D:
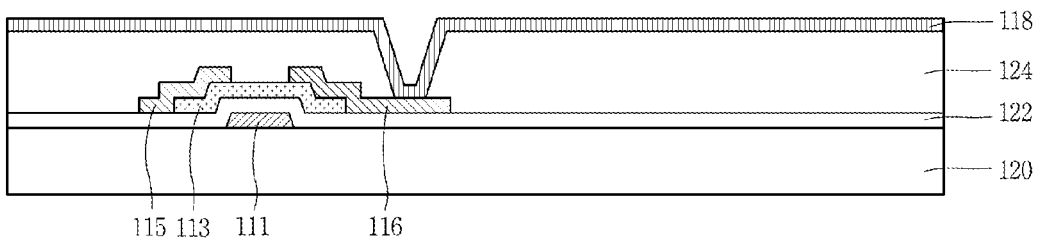

Further, the contact hole 117 is formed in the passivation layer 124 to expose the drain electrode 116 of the TFT. Subsequently, as shown in FIG. 5D, the pixel electrode 118 is formed at the display area on the passivation layer 124. In this embodiment, the pixel electrode 118 is electrically connected with the drain electrode 116 of the TFT via the contact hole 117.

The pixel electrode 118 may be formed by stacking a transparent conductive material such as ITO or IZO and metal such as Mo, AlNd, or the like, that are further etched through photolithography. Further, the first pixel electrode 118 may be formed as a plurality of metal layers. For example, a plurality of metal layers such as Cu and MoTi are continuously stacked and further etched through photolithography to form the pixel electrode 118. The first pixel electrode 118 may be formed by using carbon nano-tube (CNT) or a water-soluble conductive polymer.

Figure 5E:
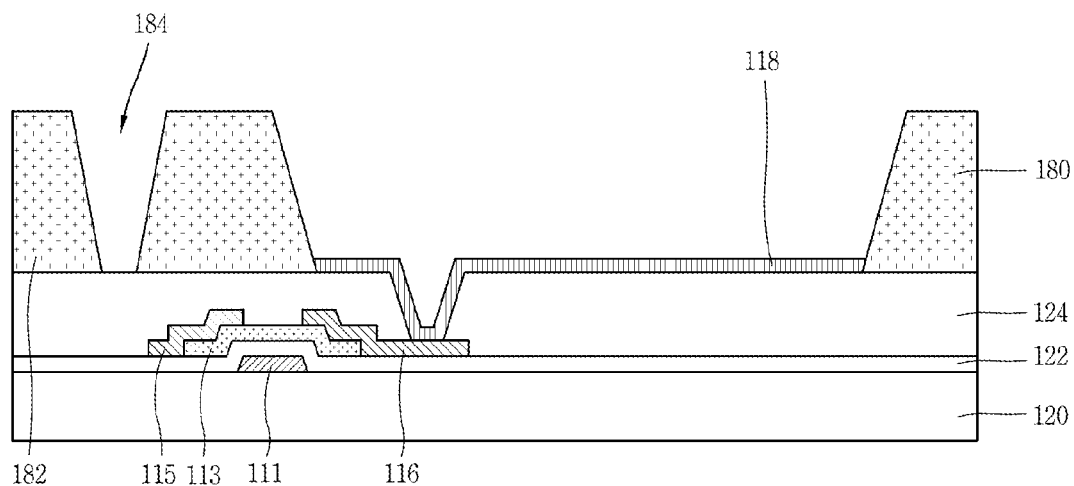

Thereafter, as shown in FIG. 5E, the partition walls 180*a* and 180*b* and the barrier 182 are formed on the passivation layer 124. The partition walls 180*a* and 180*b* are formed between unit pixels at the display area of the first substrate 120, and substantially demarcates the unit pixels. Although not shown, the partition walls 180*a* and 180*b* are formed along the boundary area of the unit pixels arranged in a matrix form on the first substrate 120, therefore, the partition wall 180*a* and 180*b* are further formed in a matrix form on the first substrate 120.

The barriers 182 are disposed apart from the outermost partition walls 180*a* and 180*b* to form the trench-shaped space 184.

The partition walls 180*a* and 180*b* may be formed by stacking an insulating layer made of a resin, or the like, that is further etched through photolithography using photoresist. In some embodiments, the partition walls 180*a* and 180*b* may be formed by stacking a photosensitive resin, which is formed by etching through photolithography. Further, a patterned partition walls 180*a* and 180*b* may be formed through a printing method such as a printing roll. In some embodiments, a mold with a recess is fabricated, and an insulating material in the mold may be transferred to the first substrate 120 to form the partition walls 180*a* and 180*b*. The partition walls 180*a* and 180*b* may be further formed through an imprinting method.

The formation of the partition walls 180*a* and 180*b* is not limited to a particular method. The foregoing methods are described for the purpose of brevity, without limiting the present invention. The partition walls 180*a* and 180*b* may be further formed through various known methods.

The barrier 182 may be formed through the same method as that of the partition walls 180*a* and 180*b*. For example, the barrier 182 may be formed by stacking a resin or a photosensitive resin which is formed by etching through photolithography, a molding method, or an imprinting method.

In this embodiment, the barrier 182 may be simultaneously formed through the same process as that of the partition walls 180*a* and 180*b*, for example, through a single mask process. In another embodiment, the barrier 182 may be formed through a separate process from that of the partition walls 180*a* and 180*b*.

In some embodiments, the pixel electrode 118 is formed on the passivation layer 124 and later, the barrier 182 is formed. However, the present invention is not limited thereto. In some embodiments, the barrier 182 may be formed first at the non-display area on the passivation layer 124 and later, the pixel electrode 118 may be formed at the display area on the passivation layer 124. In such embodiment, the passivation layer 124 and the barrier 182 may be made of the same material. For example, an insulating layer may be formed to be thick, and further removed using a diffraction mask or a half-tone mask so as to form the partition walls 180*a* and 180*b* and the contact hole 117 simultaneously. In other embodiments, a portion of the insulating layer may be removed through molding, or the like, to form the partition walls.

Figure 5F:
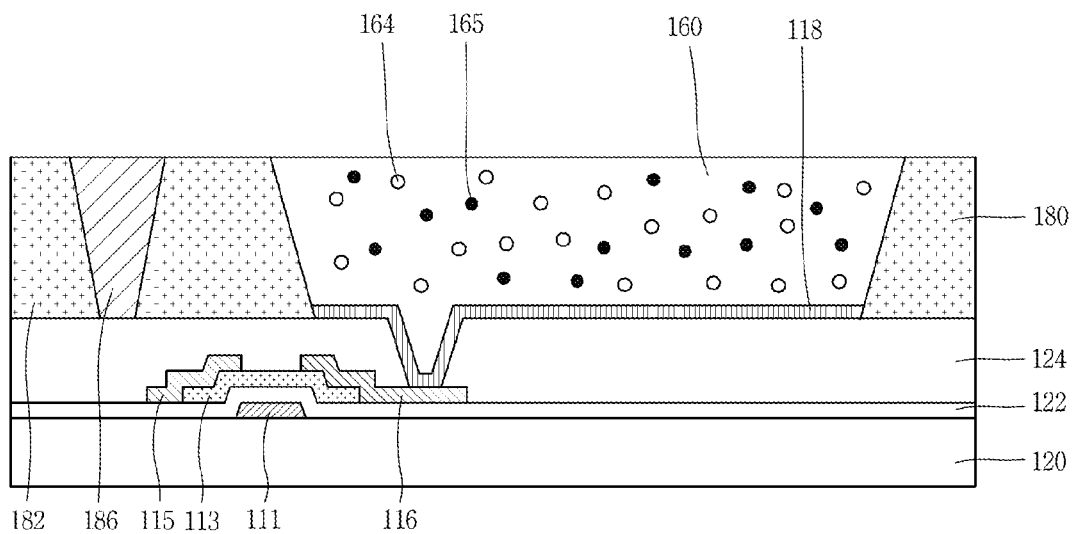

As shown in FIG. 5F, the portion between the partition walls 180*a* and 180*b* is filled with an electrophoretic material 160. The electrophoretic material may include particles having positive charge and negative charge characteristics.

In some embodiment, the particles may be white particles 164 or black particles 165, or color particles such as cyan, magenta, and yellow particles, or red (R), green (G), and blue (B) particles.

Further, the electrophoretic layer may include a dispersive medium such as a liquid polymer. In some embodiments, the dispersive material may be a transparent liquid polymer or a black liquid polymer, or a color liquid polymer corresponding to the color of each pixel. The electrophoretic material may include only white particles, black particles, or color particles without a liquid polymer. In some embodiments, the white particles, the black particles, or the color particles are distributed within the air in the interior of the electrophoretic layer 160, and are driven to move in the interior of the electrophoretic layer 160 when a voltage is applied thereto.

In some embodiments, particles having good reflexibility, such as $TiO_2$, are used for the white particles 164, and particles having black characteristics, such as carbon black, or the like, are used for the black particles 165. Further, pigment or dye may be used as the color particles in some embodiment.

The white particles 164 may have negative charge characteristics and the black particles 165 may have positive charge characteristics. In some embodiments, alternatively, the white particles 164 may have positive charge characteristics and the black particles 165 may have negative charge characteristics.

Figure 6A:
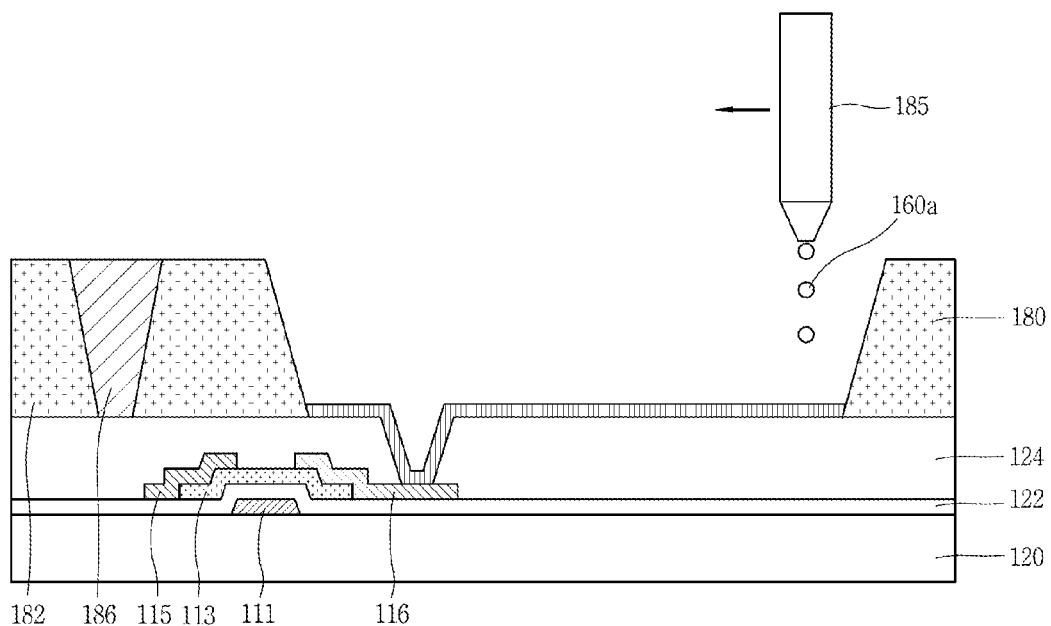
FIGS. 6A and 6B illustrate an exemplary method for sequentially forming an electrophoretic layer of an electrophoretic display device according to the first exemplary embodiment of the present invention.
Figure 6B:
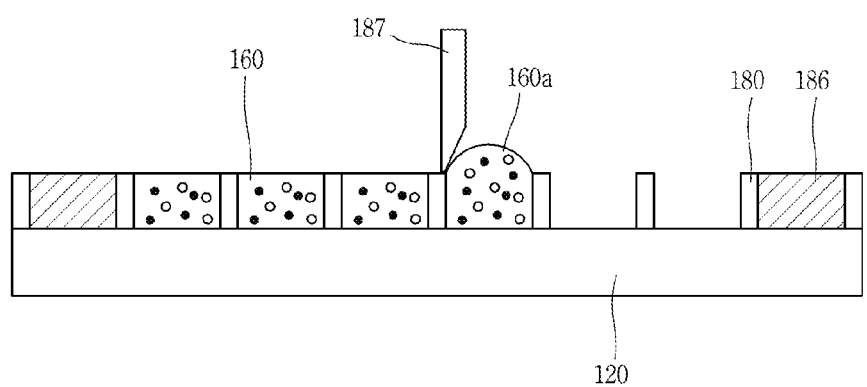

FIGS. 6A and 6B illustrate an exemplary method for forming the electrophoretic layer 160 by filling an electrophoretic material between the partition walls 180a and 180b formed on the first substrate 120.

A method illustrated in FIG. 6A is an ink-jet method or a nozzle method. As shown in FIG. 6A, an electrophoretic material 160a is filled in the interior of a syringe (or nozzle) 185, and the syringe 185 is positioned above the first substrate 120. Further, the syringe 185 is configured to move horizontally above the surface of the first substrate 120, and drop the electrophoretic material 160a to the portion between the partition walls 180a and 180b to form the electrophoretic layer 160 on the first substrate 120, where the electrophoretic material 160a is dropped due to the pressure applied to the syringe 185 using an external air supply device (not shown).

A method illustrated in FIG. 6B is a squeeze method. As shown in FIG. 6B, the electrophoretic material 160a is first applied to an upper surface of the first substrate 120 with a plurality of partition walls 180a and 180b formed thereon, and later moved by a squeeze bar 187 on the first substrate 120. Then, the electrophoretic material 160a is filled between the partition walls 180a and 180b of the unit pixels by the pressure of the squeeze bar 187 to form the electrophoretic layer 160.

The present invention is not limited to the foregoing methods. The foregoing methods show an example of the process of forming the electrophoretic layer 160 according to an exemplary embodiment of the present invention, and the present invention is not limited to the particular process. For example, various processes for forming the electrophoretic layer 160, such as a casting printing method, a bar coating printing method, a screen printing method, a mold printing method, or the like, can be employed for the present invention.

After the electrophoretic material is filled between the partition walls 180a and 180b, the sealant 186 is filled in the space 184 between the partition wall 180a and the barrier 182. Similar to the filling of the electrophoretic material, the sealant 186 may be filled in the space between the partition wall 180a and the barrier 182 through various methods, such as the ink jet method, the nozzle method, the squeeze method, the casting printing method, the bar coating method, the screen printing method, the mold printing method, and the like.

In the present embodiment, the electrophoretic material is first filled between the partition walls 180, and later, the space 184 between the partition wall 180 and the barrier 182 is filled with the sealant 186. In some embodiments, the space 184 between the partition wall 180 and the barrier 182 is first filled with the sealant 186, and later, the electrophoretic material may be filled between the partition walls 180a and 180b.

Figure 5G:
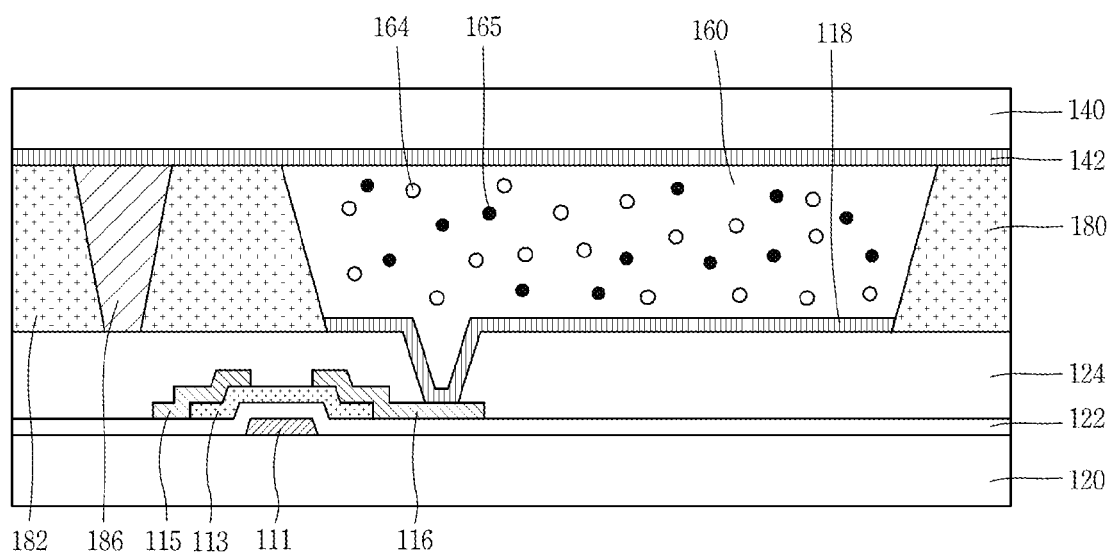

Subsequently, as shown in FIG. 5G, a transparent conductive material such as ITO or IZO is stacked on the second substrate 140 made of a transparent material, such as glass or plastic, to form the common electrode 142; the first and second substrates 120 and 140 are aligned and pressed so as to be attached together by the sealant 186 applied to the upper surface of the electrophoretic material formed between the partition walls 180a and 180b; and further, heat or ultraviolet ray is irradiated thereto to cure the sealant 186 to complete the electrophoretic display device.

In some embodiments, the first and second substrates 120 and 140 are attached by the sealant 186, or an adhesive layer made of an adhesive material may be formed to improve the bonding force of the first and second substrates 120 and 140.

Although not shown, a color filter layer may be formed on the second substrate 140. The color filter layer may include red (R), green (G), and blue (B) color filters. When the electrophoretic material includes black particles and white particles, it implements a color.

Figure 7:
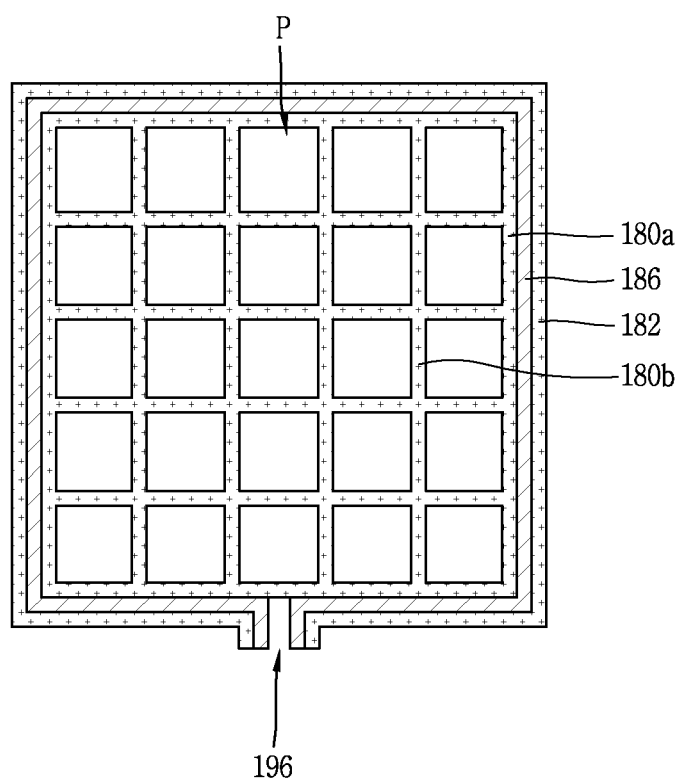
FIG. 7 is a plan view of the electrophoretic display device according to a first embodiment of the present invention.

FIG. 7 is the plan view of the electrophoretic display device according to a first exemplary embodiment of the present invention.

As shown in FIG. 7, the partition walls 180a and 180b are formed within the electrophoretic display device in matrix form. The outer partition wall 180a is formed along the borderline of the electrophoretic display device to surround a plurality of pixels P. The barrier 182 is formed at the outside of the outer partition wall 180a in a predetermined distance to the outer partition wall 180a. The sealant 186 is filled in a space between the outer partition wall 180a and the barrier 182.

The barrier 182 may comprises an outlet 196 formed at one side of the electrophoretic display device. Further, since the sealant 186 is only filled in the space between the outer partition wall 180a and the barrier 182, the outlet 196 is also formed at the outer partition wall 180a. In other words, the outlet 196 is simultaneously formed at the outer partition wall 180a and the barrier 182.

The outlet 196 may be configured to discharge the over-filled electrophoretic material between the partition walls 180a and 180b. When the electrophoretic material is filled between the partition walls 180a and 180b using the methods shown in FIGS. 6A and 6B, the electrophoretic material may be over-filled between the partition walls 180a and 180b. The over-filled electrophoretic material causes quality deterioration of the electrophoretic display device. The outlet 196 is configured to discharge the excessive electrophoretic material. That is, when the electrophoretic material is filled between the partition walls 180a and 180b using the methods shown in FIGS. 6A and 6B, the excessive electrophoretic material is discharged through the outlet 196.

FIG. 7 shows only one outlet 196 formed on the barrier 182 at one side of the electrophoretic display device. However, in some other embodiments, a plurality of outlets 196 may be formed on the barrier 182 at one or more sides of the electrophoretic display device.

Figure 8:
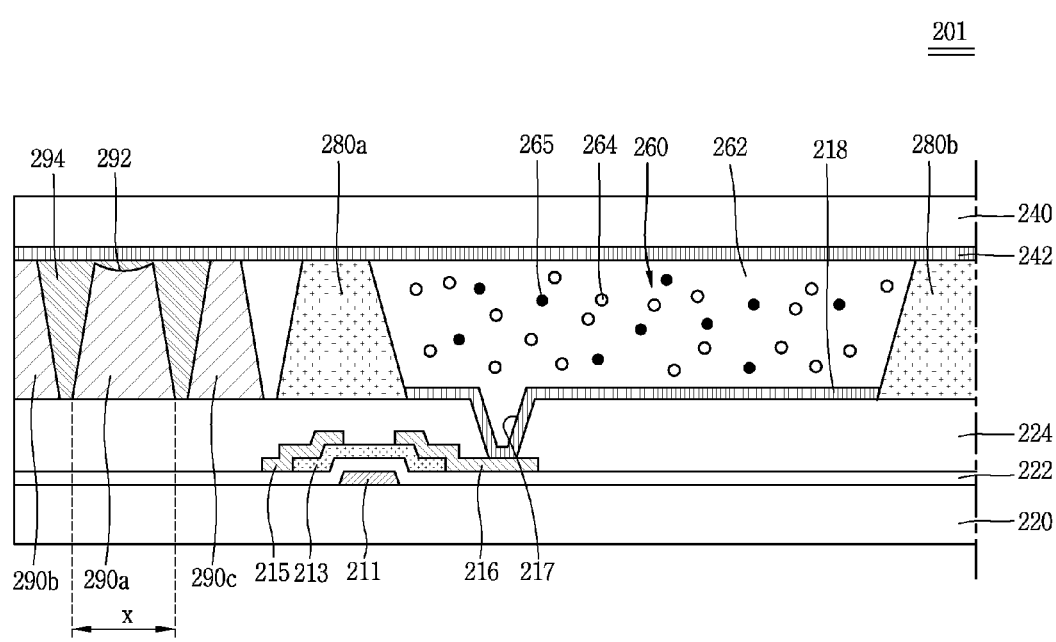
FIG. 8 is a sectional view of an electrophoretic display device according to a second embodiment of the present invention.

FIG. 8 is a sectional view of an electrophoretic display device according to a second exemplary embodiment of the present invention. The same configuration as that of the first exemplary embodiment of the present invention will be described briefly and a different configuration will be described in detail.

As shown in FIG. 8, the electrophoretic display device according to the second exemplary embodiment of the present invention includes a first substrate 220 and a second substrate 240 made of transparent glass or plastic, a TFT formed on the first substrate 220, a passivation layer 224 formed on the first substrate 220 with the TFT formed thereon, a pixel electrode 218 formed at a display area on the passivation layer 224, a partition walls 280a and 280b formed between unit pixels at the display area on the passivation layer 224, a plurality of barriers 290a, 290b, and 290c formed at a non-display area on the passivation layer 224, an electrophoretic layer 260 formed at unit pixels between the separation walls 280a and 280b, a common electrode 242 formed on the second substrate 240, and a sealing material (or a sealing compound) 294 filled in a space 293 between an upper surface of the first barrier 290a, and the barriers 290a, 290b, and 290c to attach and seal the first and second substrates 220 and 240.

The TFT includes a gate electrode 211 formed on the first substrate 220, a gate insulating layer 222 formed on the first substrate 220 with the gate electrode 211 formed thereon, a semiconductor layer 213 made of a semiconductor material such as amorphous silicon (a-Si) and formed on the gate insulating layer 222, and a source electrode 215 and a drain electrode 216 formed on the semiconductor layer 213.

The partition walls 280a and 280b are formed between the unit pixels at the display area to demarcate the unit pixels, and hermetically seal the electrophoretic layer 260 formed at the unit pixels.

The electrophoretic layer 260 may include white particles having positive charge characteristics, black particles 265 having negative charge characteristics, and a dispersive medium in which the white particles 264 and the black particles 265 are dispersed.

The barriers 290a, 290b, and 290c are made of an organic insulating material. In some embodiment, the barriers 290a, 290b, and 290c may be made of the same material and through the same process as that of the partition walls 280a and 280b; while in some other embodiments, the barriers 290a, 290b, and 290c may be made of a different material through a different process.

In the present embodiment, the height of the barriers 290a, 290b, and 290c may be approximately 10 μm or greater. In some embodiments, the height of the barriers 290a, 290b, and 290c may range from 10 μm to 50 μm, and a line width x of the barriers 290a, 290b, and 290c may range from 10 μm to 5,000 μm. In some embodiments, the line width x of the barriers 290a, 290b, and 290c may range from 100 μm to 1,000 μm.

In FIG. 8, the structure of three barriers 290a, 290b, and 290c are illustrated. However, in some embodiments, four or more barriers may be formed.

Further, the barriers 290a, 290b, and 290c may have various shapes from a top view. For example, the barriers 290a, 290b, and 290c may have various planar shapes as shown in FIG. 4 according to the first exemplary embodiment of the present invention.

The sealing material 294 is filled on an upper surface of the first barrier 290a in a center area, in the interior of a recess 292, and in the space 293 between the barriers 290a, 290b, and 290c in order to seal the first substrate 220 and the second substrate 240 simultaneously when they are attached.

The central first barrier 290a, among the three barriers 290a, 290b, and 290c, is attached to the second substrate 240 by the sealant applied to the upper surface to attach the first substrate 220 and the second substrate 240. Further, the second barrier 290b and the third barrier 290c at both sides of the first barrier 290a prevent the sealing material 294 from flowing to an area other than a pre-determined area, thus minimizing the width of the sealing material 294. In some embodiment, the second barrier 290b and the third barrier 290c are configured to confine the position of the sealing material 294 filled in the space 293, and prevent the sealing material 294 from spreading to an area other than a sealing area in which a seal pattern is formed, for example, to an inner side or an outer side of the sealing area.

The recess 292 formed on the upper surface of the first barrier 290a increases the area of the upper surface of the first barrier 290a. Since the sealing material 294 is filled in the interior of the recess 292, the recess 292 increases the surface area in contacting with the sealing material 294 to improve an adhesive strength between the first barrier 290a and the second substrate 240. Further, when the first barrier 290a is attached to the second substrate 240, pressure is applied to the recess 292 and the second substrate 240, an internal pressure of the space of the recess 292 is lower than an external pressure. Therefore, the adhesive strength between the first barrier 290a and the second substrate 240 can be further improved.

In FIG. 8, one recess 292 formed on the upper surface of the second barrier 290a is illustrated. However, the present invention is not limited thereto, and a plurality of recesses may be formed on the upper surface of the first barrier 290a in some embodiment.

The pixel electrode 218 made of a transparent conductive or opaque metal, is electrically connected with the drain electrode 216 of the TFT through a contact hole 217 formed in the passivation layer 224. In some embodiment, the pixel electrode 218 may be formed only at the display area on the passivation layer 224; while in some other embodiments, the pixel electrode 218 may be extended to be formed on the passivation layer 224 and on the side wall of the partition walls 280a and 280b.

In the present exemplary embodiment, since the plurality of barriers 290a, 290b, and 290c are formed to surround the display area at the non-display area of the electrophoretic display device 201, and the sealing material 294 is positioned on the upper surface of the first barrier 290a, among the barriers 290a, 290b, and 290c, and in the space 293 between the barriers 290a, 290b, and 290c, the sealing material 294 can be prevented from flowing to the inner side or outer side of the partition wall 280a when the first and second substrates 220 and 240 are attached, and a degradation of the bonding force and sealing force between the first and second substrates 220 and 240 can be prevented.

The electrophoretic display device 201 having the foregoing structure is fabricated in a same manner as the fabrication method of the first exemplary embodiment illustrated in FIGS. 5A to 5G. Compared with the first exemplary embodiment in which only one barrier is formed, in the second exemplary embodiment, a plurality of barriers are formed, and the at least one recess 292 is formed on the upper surface of the first barrier 290a. Thus, in the second exemplary embodiment, as shown in FIG. 7, the barriers 290a, 290b, and 290c may be formed when the partition walls 280a and 280b are formed, and further, the recess 292 may be formed on the upper portion of the first barrier 290a through a separate photo process. In some embodiment, a half-tone mask or a diffraction mask may be formed so as to simultaneously form the recess 292 when the barriers 290a, 290b, and 290c are formed.

In some embodiments, the passivation layer 224 and the partition walls 280a and 280b may be formed through a single process, rather than through separate processes. For example, after the insulating layer is stacked on the first substrate 220, the passivation layer 224, the partition walls 280a and 280b, the barriers 290a, 290b, and 290c, and the recess 292 may be formed at the same time through a diffraction exposure or a half-tone exposure.

The structure of the electrophoretic display device of the present invention has been described, however, the present invention is not limited thereto. In particular, various types of electrophoretic layers can be employed according to the present invention. For example, any type of electrophoretic layers can be employed to the first substrate.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. An electrophoretic display device comprising:
   a first substrate including a display area in which a plurality of pixels are arranged and a non-display area at an outer side of the display area;
   a second substrate corresponding to the first substrate and having a common electrode formed thereon;
   a switching device at each pixel;
   a passivation layer on the first substrate to cover the switching device formed thereon;
   a pixel electrode at each pixel on the passivation layer;
   a partition walls disposed in the display area on the passivation layer;
   an electrophoretic layer between the partition walls;
   at least one barrier configured to surround the display area, the barrier being spaced apart from the outermost partition wall; and
   a sealant filled in a space between the outermost partition wall and the barrier to seal the first and the second substrates.

2. The electrophoretic display device of claim 1, wherein the barrier comprises at least one opening.

3. The electrophoretic display device of claim 1, wherein the barrier is configured to have the same height as that of the partition wall.

4. The electrophoretic display device of claim 3, wherein the width of the barrier ranges from 10 μm to 5,000 μm.

5. The electrophoretic display device of claim 4, wherein the width of the barrier ranges from 100 μm to 1,000 μm.

6. The electrophoretic display device of claim 1, wherein the electrophoretic layer comprises white particles, black particles, and a dispersive medium.

7. The electrophoretic display device of claim 6, wherein the dispersive medium is a transparent aqueous medium.

8. The electrophoretic display device of claim 1, wherein the electrophoretic layer comprises white particles, color particles, and a dispersive medium.

9. The electrophoretic display device of claim 1, wherein the barrier is made of the same material as that of the partition wall.

10. The electrophoretic display device of claim 1, wherein the height of the barrier ranges from 1 μm to 100 μm.

11. The electrophoretic display device of claim 1, wherein one to five barriers are disposed on the non-display area.

12. The electrophoretic display device of claim 11, wherein at least one of the barriers has a recess formed on an upper surface thereof.

13. A method for fabricating an electrophoretic display device, the method comprising:
   providing a first substrate including a display area in which a plurality of pixels are arranged and a non-display area at an outer side of the display area;
   providing a second substrate corresponding to the first substrate and having a common electrode formed thereon;
   forming a switching device at each pixel on the first substrate;
   forming a passivation layer on the first substrate with the switching device thereon;
   forming a pixel electrode in each pixel on the passivation layer;
   forming a partition walls in the display area on the passivation layer;
   forming a at least one barrier configured to surround the display area, the barrier being spaced apart from the outermost partition wall;
   forming an electrophoretic layer between the partition walls;
   filling a sealant in a space between the outermost partition wall and the barrier; and
   attaching the first and second substrates.

14. The method for fabricating an electrophoretic display device of claim 13, wherein the filling of the electrophoretic layer comprises filling an electrophoretic material and a dispersive medium.

15. The method for fabricating an electrophoretic display device of claim 14, wherein the barrier and the partition wall are formed in a single mask process.

16. The method for fabricating an electrophoretic display device of claim 15, wherein the electrophoretic material comprises white particles and black particles.

17. The method for fabricating an electrophoretic display device of claim 15, wherein the electrophoretic material comprises white particles and color particles.

18. The method for fabricating an electrophoretic display device of claim 14, wherein the forming of the barrier comprises forming a recess on an upper surface of the barrier.

19. The method for fabricating an electrophoretic display device of claim 13, wherein the forming of the electrophoretic layer in the pixel is performed by a method selected from an ink jet method, a squeeze method, a casting printing method, a bar coating printing method, a screen printing method, and a mold printing method.

20. The method for fabricating an electrophoretic display device of claim 13, wherein the filling of the sealant between the outermost partition wall and the barrier is performed by a method selected from an ink-jet method, a squeeze method, a casting printing method, a bar coating printing method, a screen printing method, and a mold printing method.

* * * * *